(12) United States Patent
Sauthoff et al.

(10) Patent No.: US 12,529,273 B2
(45) Date of Patent: Jan. 20, 2026

(54) SYSTEM AND METHOD FOR CALCULATING MUD DENSITY

(71) Applicant: Baker Hughes Oilfield Operations, LLC, Houston, TX (US)

(72) Inventors: Bastian Sauthoff, Burgdorf (DE); Volker Peters, Celle (DE); Thomas Wettmarshausen, Hanover (DE)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 18/771,399

(22) Filed: Jul. 12, 2024

(65) Prior Publication Data

US 2025/0020033 A1    Jan. 16, 2025

Related U.S. Application Data

(60) Provisional application No. 63/513,785, filed on Jul. 14, 2023.

(51) Int. Cl.
*E21B 21/08* (2006.01)
*E21B 21/10* (2006.01)
*E21B 47/06* (2012.01)

(52) U.S. Cl.
CPC .............. *E21B 21/08* (2013.01); *E21B 47/06* (2013.01)

(58) Field of Classification Search
CPC ...... E21B 21/08; E21B 21/082; E21B 21/103; E21B 47/18; F16K 31/1223; F16K 31/154
See application file for complete search history.

(56) References Cited

U.S. PATENT DOCUMENTS

| 4,641,289 A | 2/1987 | Juergens |
| 6,586,084 B1 | 7/2003 | Paschk et al. |

(Continued)

FOREIGN PATENT DOCUMENTS

| WO | 02059461 A1 | 8/2002 |
| WO | 2008053155 A1 | 5/2008 |

OTHER PUBLICATIONS

International Preliminary Report on Patentability for International Application No. PCT/US2020/040602, dated Oct. 5, 2020.

(Continued)

*Primary Examiner* — Kenneth L Thompson
(74) *Attorney, Agent, or Firm* — Bracewell LLP; Keith R. Derrington

(57) ABSTRACT

Drilling mud is flowed through a valve assembly that is set at a particular open amount, measurements are taken of mud flowrate and a force exerted by the drilling mud onto a portion of the valve assembly, and density of the drilling mud is estimated based on historical data. The historical data is generated by directing multiple flows through the valve assembly, where the flows are at different flowrates, and at each flowrate different drilling muds having different densities are directed through the valve assembly. For each flow the valve assembly is adjusted to different open amounts, and a corresponding force exerted by the flow onto the valve assembly is measured. An example of the valve assembly is a mud pulser with a plug member that engages an orifice opening, a sensor in the pulser measures force exerted by the flow of mud.

20 Claims, 9 Drawing Sheets

(56) References Cited

U.S. PATENT DOCUMENTS

| | | | |
|---|---|---|---|
| 7,319,638 B2* | 1/2008 | Collette | G01V 11/002 |
| | | | 340/854.4 |
| 8,917,575 B2 | 12/2014 | Peters | |
| 9,243,492 B2 | 1/2016 | Fraser | |
| 9,334,725 B2* | 5/2016 | Sitka | E21B 47/24 |
| 9,951,612 B2* | 4/2018 | Brown-Kerr | E21B 47/18 |
| 11,892,093 B2* | 2/2024 | Peters | F16K 31/52 |
| 2005/0260089 A1 | 11/2005 | Hahn et al. | |
| 2007/0056771 A1 | 3/2007 | Gopalan et al. | |
| 2011/0011594 A1 | 1/2011 | Young et al. | |
| 2016/0010449 A1 | 1/2016 | Liu et al. | |
| 2016/0245079 A1 | 8/2016 | Perry et al. | |
| 2021/0003230 A1 | 1/2021 | Peters | |

OTHER PUBLICATIONS

International Search Report and Written Opinion for PCT Application No. PCT/US2024/037843 dated Nov. 7, 2024.

* cited by examiner

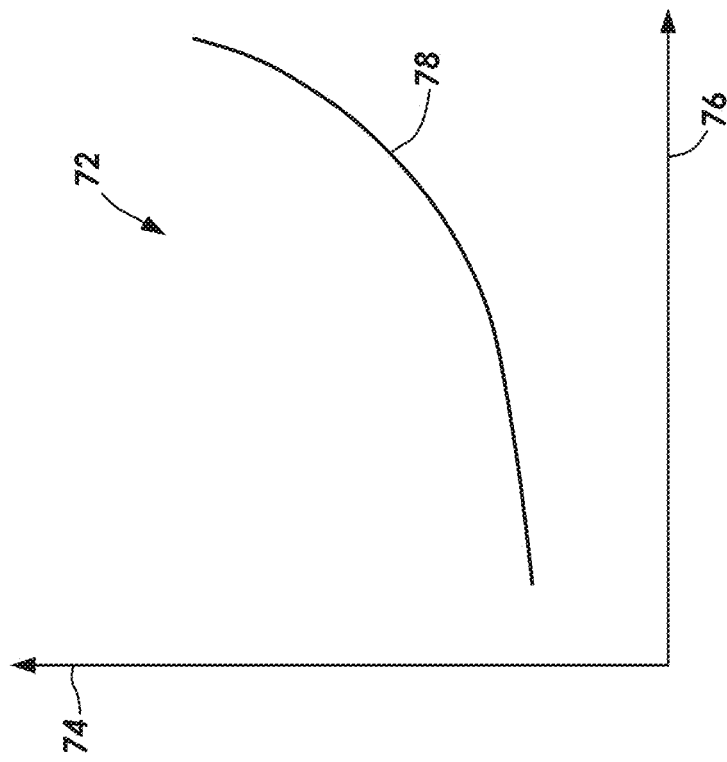
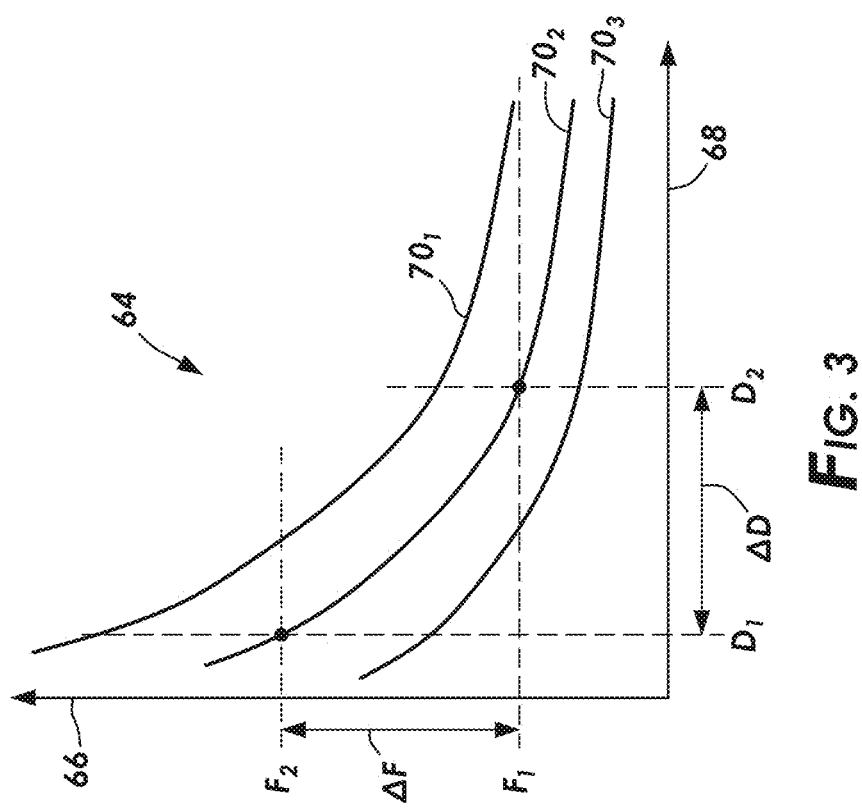

SYSTEM AND METHOD FOR CALCULATING MUD DENSITY

This application claims priority to and the benefit of U.S. Provisional Application Ser. No. 63/513,785, filed Jul. 14, 2023.

BACKGROUND OF THE INVENTION

1. Field of Invention

The present disclosure relates to a mud pulse system, and more specifically to estimating mud density based on monitored characteristics of the mud pulse system.

2. Description of Prior Art

Drilling systems having earth boring drill bits on an end of a drill string are typically used in the oil and gas industry for creating wells drilled into hydrocarbon bearing geologic formations. Drilling mud is usually injected into the drill string during drilling. The drilling mud exits the drill string through nozzles formed in the drill bit and flows back to surface in the annular space between the drill string and wellbore walls. The drilling mud serves a variety of purposes, such as preventing an uncontrolled flow of fluids from the formation to surface by the static head of the column of drilling mud in the well. The drilling mud also cools the drill bit as it exits the nozzles; and removes formation cuttings from the bottom of the well that are created during drilling.

The drilling mud also provides a medium for transmitting signals, often in the form of pressure pulses, that convey information monitored downhole; such as pressure, temperature, formation resistivity, formation density, and tool location. The pressure pulses are typically created with a mud pulser mounted in the drill string, which meters the fluid at discrete sequences and durations. The pressure pulses are monitored with sensors on surface and then decoded to identify the underlying information.

SUMMARY OF THE INVENTION

Disclosed is an example of a downhole valve assembly for use in a wellbore to determine a fluid density that includes, a housing, a flow restrictor with an opening, a fluid flowing through the valve assembly and through the opening of the flow restrictor, a plug member configured to plug at least partially the opening of the flow restrictor, an actuator configured to drive the plug member relative to the flow restrictor to select a flow restricted area, a flow meter to measure a flow rate of the fluid flowing through the valve assembly, a measurement device in or on the valve assembly configured to measure a parameter related to a force acting on at least one of the flow restrictor and the plug member due to the fluid flowing through the valve assembly. In this example the valve assembly includes a processor that is configured to position the plug member in a selected position corresponding to the selected flow restricted area, and to use the actuator to obtain measurement data from the measurement device while the plug member is in the position corresponding to the selected flow restricted area, and determine a fluid density using the obtained measurement data and the measured flow rate. In an example, the measurement device is a force sensor configured to measure the force acting on the at least one of the flow restrictor and the plug member, and the measurement data is force data. An embodiment of the actuator includes an electrical motor, the measurement device is configured to measure a parameter related to an electrical power consumption of the electrical motor that is required by the electrical motor to hold the plug member in the position corresponding to the selected flow restricted area, and the measurement data is one of electrical power consumption data and electrical motor current data; and optionally, the processor is configured to oscillate the plug member around the position corresponding to the selected flow restricted area and determine the fluid density includes to calculate an average of one of the electrical power consumption data and the electrical motor current data. In an example, the valve assembly includes a piston and a locomotive connection. In one embodiment, the valve assembly is a shear valve, the flow restrictor is a stator including at least one opening, and the plug member is a rotor disc including at least one blade. Examples of the selected position include a first selected position corresponding to a first selected flow restricted area and a second selected position corresponding to a second selected flow restricted area, and the measurement data includes first measurement data and second measurement data, the processor is configured to position the plug member in the first selected position and position the plug member in the second selected position and obtain the first measurement data from the measurement device while the plug member is in the first selected position and obtain the second measurement data from the measurement device while the plug member is in the second selected position and determine the fluid density using the first measurement data and the second measurement data. In an alternate example, the actuator includes a spindle, and the measurement device is a torque meter configured to measure a torque acting on the spindle, and the measurement data is torque data. In another alternative, the valve assembly is part of a downhole telemetry system, and the fluid is a drilling mud, the valve assembly generates pressure pulses in the drilling mud in the wellbore, and the downhole telemetry system comprises a pressure transducer at a surface location configured to detect the pressure pulses. The processor is optionally configured to determine the fluid density using historical data, and in alternatives the measurement device is in or on the actuator.

Also disclosed is a method for measuring a fluid density in a wellbore that includes directing a flow of fluid through a valve assembly in the wellbore in which the valve assembly includes a housing, an actuator, a plug member, a processor, a measurement device, a flow meter and a flow restrictor. Further included in this example method is defining a selected flow restricted area by using the processor and the actuator to position the plug member relative to an opening of the flow restrictor, detecting a flow rate of the flow of fluid, using the flow meter, using the measurement device to measure measurement data related to a force exerted on at least one of the flow restrictor and the plug member by the flow of fluid, using the processor to obtain the measurement data from the measurement device, determining a fluid density with the processor and based on the measurement data and the detected flow rate, and adjusting an operational parameter based on the determined fluid density. In one example, the measurement device is a force sensor and the measurement data is force data. Embodiments exist in which the actuator is an electrical motor, and measuring the measurement data includes measuring electrical current data or electrical power consumption data using the measurement device; an alternative to this embodiment includes using the processor and the actuator to oscillate the plug member around a position corresponding to the selected flow restricted area, and determining the fluid density includes calculating an average of at least one of the electrical current data and the electrical power consumption data. In an alternative, the valve assembly includes a piston and a locomotive connection, or the valve assembly is a shear valve and the flow restrictor is a stator and the plug member is a rotor disc. In another example, the selected position includes a first selected position corresponding to a first flow restricted area and a second selected position corresponding to a second flow restricted area, and the measurement data includes first measurement data and second measurement data, positioning the plug member in the first selected position and positioning the plug member in the second selected position, obtaining the first measurement data from the measurement device while the plug member is in the first selected position and obtaining the second measurement data from the measurement device while the plug member is in the second selected position and determining the fluid density using the first measurement data and the second measurement data. In an alternative, the actuator includes a spindle and the measurement device is a torque meter, and the method includes measuring a torque acting on the spindle using the torque meter. Determining the fluid density optionally includes using historical data, wherein the historical data are obtained in a lab, in an offset well, or by using a calculation. Alternatives exist in which determining of the fluid density is performed while the processor is in the wellbore and while performing a downhole operation. Optionally, adjusting an operational parameter includes adjusting one or more of an operational parameter of the valve assembly, and an operational parameter of a drilling system. In another embodiment, the measurement device is in or on the actuator.

BRIEF DESCRIPTION OF DRAWINGS

Some of the features and benefits of the present invention having been stated, others will become apparent as the description proceeds when taken in conjunction with the accompanying drawings, in which:

FIG. 3 is a graph of example forces versus different set distances in the valve assembly of FIG. 1, and for drilling muds with different mud densities.

FIG. 4 is a graph of drilling mud density versus measured force at a particular set distance in the valve assembly of FIG. 1.

Figure 1:
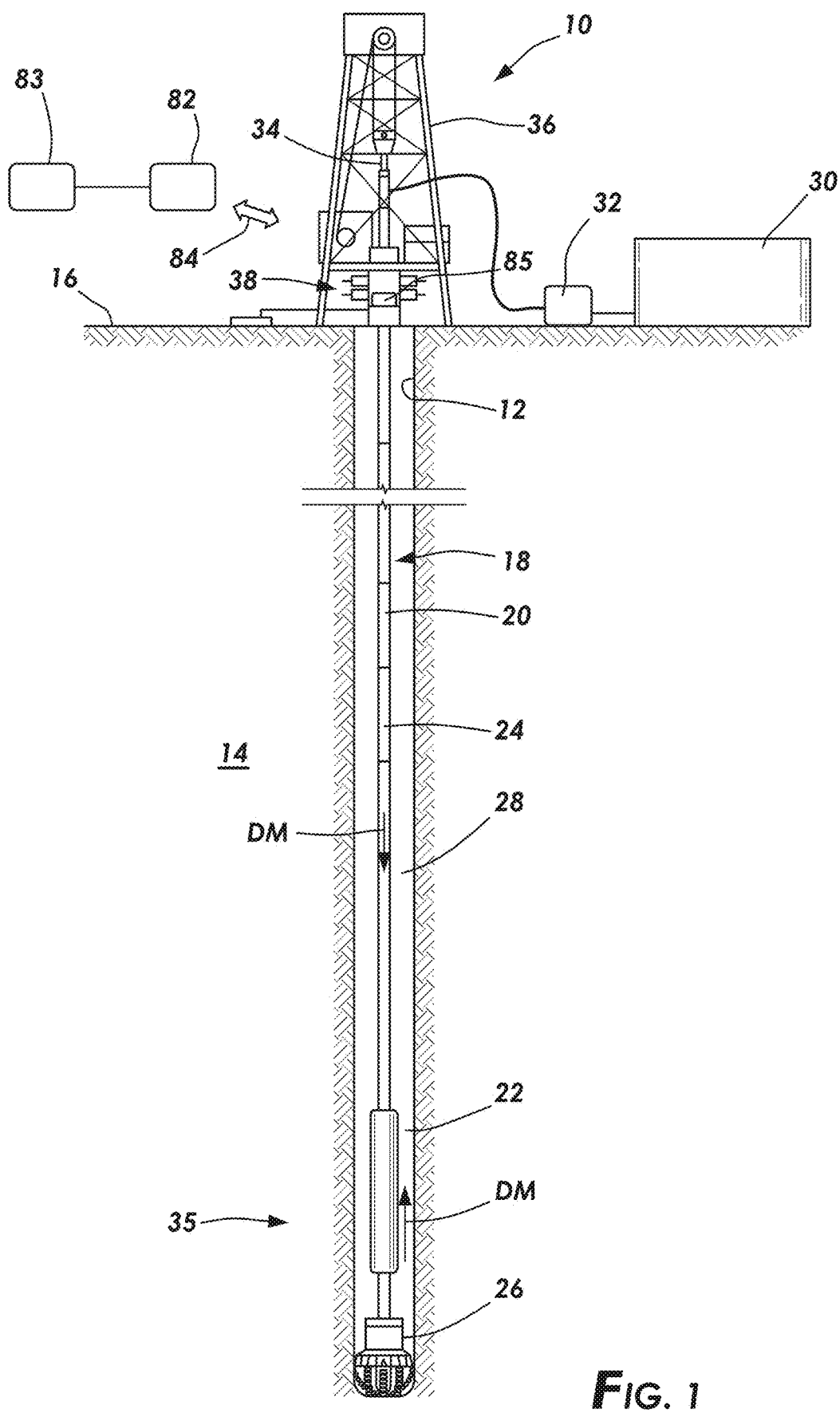
FIG. 1 is a side partial sectional view of an example of a drilling system having a valve assembly.

While subject matter is described in connection with embodiments disclosed herein, it will be understood that the scope of the present disclosure is not limited to any particular embodiment. On the contrary, it is intended to cover all alternatives, modifications, and equivalents thereof.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of a cited magnitude. In an embodiment, the term "substantially" includes +/−5% of a cited magnitude, comparison, or description. In an embodiment, usage of the term "generally" includes +/−10% of a cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

An example of using a drilling assembly 10 to form a wellbore 12 is shown in a side partial section view in FIG. 1, and in which wellbore 12 extends into a subterranean formation 14 from surface 16. Included with assembly 10 is a drill string 18 made up of multiple joints of drill pipe 20 that fit end to end. Integrally within the drill string 18 is a valve assembly 22, which as described in more detail below selectively restricts a flow of drilling mud DM through the drill string 18 and in alternatives operates as a mud pulser generating mud pulses that travel to the surface. In FIG. 1 drilling mud DM flows within an inner bore 24 of the drill string 18 to a drill bit 26 coupled to a lower terminal end of the drill string 18. The drilling mud DM exits bit 26 through nozzles (not shown) on its lower end, and flows back uphole within an annulus 28 between sidewalls of the wellbore 12 and drill string 18. The drilling mud DM is provided from a mud source 30, such as a mud pit, a suction tank, and/or shaker tank, which are outside the wellbore 12 on surface 16. A line connected to a discharge of the mud source 30 feeds the drilling mud DM to a pump 32 that pressurizes the drilling mud DM. From the pump 32 the pressurized drilling mud DM flows through a line to a connection on a kelly 34, which is suspended within a derrick 36 shown assembled over an opening of wellbore 12. An upper end of drill string 28 connects to a lower end of kelly 34, below its connection to the kelly 34, drill string 18 inserts into a wellhead assembly 38 mounted on top of an opening of wellbore 12. At the lower end of the drill string 18 is a bottom hole assembly ("BHA") 35, which in examples includes downhole components for drilling the borehole. Embodiments of the BHA 35 include components to determine the downhole location of the BHA 35 and the drill bit 26 and to determine the properties of the rock formation 14 surrounding the wellbore 12, including detecting hydrocarbon bearing rock formation layers. The BHA 35 optionally includes a mud motor and/or a steering unit (not shown) to control the trajectory of the wellbore 12, and one or more of the following: a formation evaluation device (FE device), such as a resistivity device, a nuclear resonance device, an acoustic device, a density device, or a formation sampling device, a measurement while drilling device (MWD) configured to detect inclination and azimuth of the borehole, an accelerometer, a magnetometer, a power source, such as a downhole generator or a battery, and a telemetry device to communicate with the surface. Examples of the telemetry device include a mud pulser, an electromagnetic telemetry device, or an acoustic telemetry device. In an alternative configuration the BHA 35 and the drill string 18 include a wire (not shown) to the surface (wired pipe). The term uphole in this application refers to a direction closer to the earth surface. The term downhole refers to a direction closer to the bottom end of the drill string 18 in the borehole. The term upstream refers to a direction in relation to the location where the drilling mud DM is pumped into the inner bore of the drill string. An upstream direction is closer to the pump 32 that pumps the drilling mud into the inner bore of the drill string. A downstream direction is farther away from the pump 32.

Figure 2:
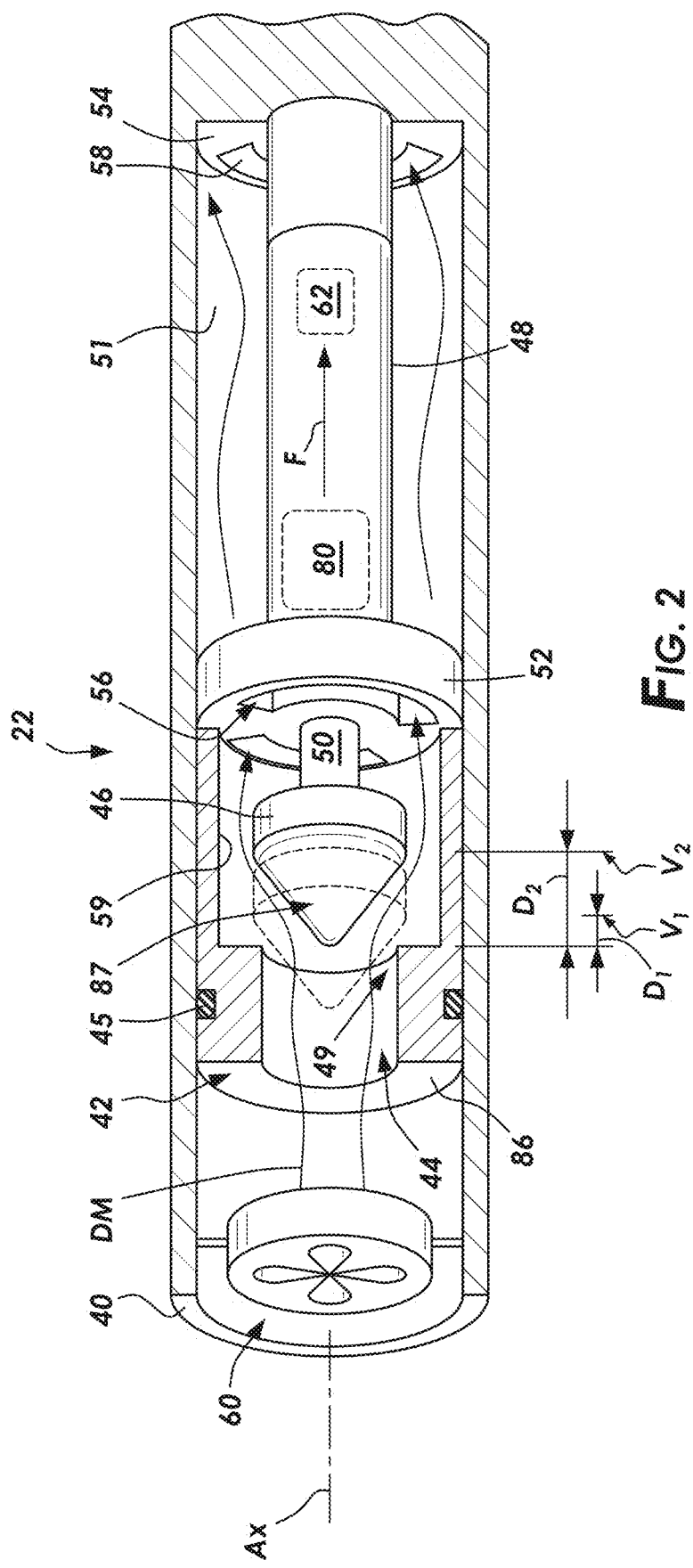
FIG. 2 is a side partial sectional view of the valve assembly of FIG. 1.

FIG. 2 is a partial side sectional view of an example of the valve assembly 22, and that includes an outer housing 40 that as shown, is a tool collar, which is annular, and part of the BHA 35. Valve assembly 22 includes an orifice or a flow restrictor 42 mounted within housing 40, which is a generally cylindrical member with a diameter exceeding its length. An opening 44 is formed axially through orifice 42, which as shown is generally coaxial with axis Ax of the valve assembly 22, and a seal 45 circumscribing orifice 42. A plug member 46 is spaced an axial distance downstream of opening 44, which has a generally conical or frusto-conical surface facing the opening 44. Downstream of plug member 46 is an actuator 48 for selectively repositioning plug member 46 at different distances away from opening 44; in the example of FIG. 2, this distance is illustrated as a set distance $D_2$, also referred to herein as second set distance. The set distance $D_2$ is the distance between the lower end of orifice 42 and the upper end of plug member 46. Alternatively, the set distance $D_2$ is the axial distance between a valve seat 49 in orifice 42 and the location on of the plug member 46 that abuts the valve seat 49 (seating area) when the valve is seated (valve in closed position), or is the distance the plug member 46 travels from the $V_2$ position to the seated position. An example of a valve seated or closed position is the plug member 46 inserted into the orifice 42 to substantially block a flow of drilling mud DM through opening 44. When the plug member 46 abuts the valve seat 49 the opening 44 is closed and no fluid flows through opening 44. A stem 50 is shown having an end connected to a side of plug member 46 opposite from opening 44 and an opposite end coupled with actuator 48. In examples, operating actuator 48 displaces stem 50 and plug member 46 to move plug member 46 to a different set distance $D_1$, also referred to herein as a first set distance and as shown in dashed outline. The first set distance $D_1$ is the distance between the valve seat 49 in orifice 42 and the location on the plug member 46 that abuts the valve seat when the valve is seated (valve closed position), or is the distance the plug member 46 travels from the $V_1$ position to the seated position. In one embodiment, a percent opening of the valve assembly 22 is dependent on the location of plug member 46, and defines the effect the plug member 46 position has on the flow of fluid through the valve assembly 22. In examples, when the plug member 46 is placed in contact with the opening 44 (the plug member makes contact with a valve seat 49) and blocks a flow of fluid (any fluid including drilling mud) through the valve assembly 22, a percent opening of the valve assembly 22 is substantially equal to 0% (fully closed), and when the plug member 46 is placed away from the opening 44 and has no effect on the flow of fluid through the valve assembly, the percent opening of the valve assembly 22 is substantially equal to 100% (fully open). In a plug member position between the fully closed and the fully open position, a pressure drop is generated across the valve assembly 22 which is between a maximum pressure drop (fully closed position) and a minimum pressure drop (fully open position). In a non-limiting example of operation while drilling mud is flowing in drill string 18, the plug member 46 does not close the opening 44 completely and does not contact the valve seat 49. Also, no contact of the plug member with the valve seat provides an advantage of avoiding wear of the plug member 46 and valve seat 49. The set distance $D_1$ or the plug member position $V_1$ is an example of a valve closed position, and the set distance $D_2$ or plug member $V_2$ position is an example of a valve open position. In the example of FIG. 2, plug member positions $V_1$ and $V_2$ correspond to the axial location on the plug member 46 where its shape transitions from frusto-conical to cylindrical, and where that location is situated in the valve closed and open positions respectively. In alternatives, actuator 48 includes an electrical motor (not shown) or hydraulics as the energy source for selectively moving plug member 46, such as to selected set distances (e.g., $D_1$ or $D_2$) from opening 44 and along axis $A_X$. In an example, the set distance is $D_2$ and the different set distance (dashed outline) is $D_1$. The set distance $D_1$ is a given travel $\Delta D$ away from the set distance $D_2$. In an alternative embodiment the set distance is $D_1$ (dashed outline) and the different set distance is $D_2$. The different set distance $D_2$ is a given travel $\Delta D$ away from the set distance $D_1$ That is, the given travel is $\Delta D=|D_1-D_2|=|D_2-D_1|$. For most applications of valve assembly 22, all drilling mud is directed through opening 44 in orifice 42. In one more embodiment, however, there optionally exists a bypass (not shown) for a small amount of drilling mud to bypass orifice 42 and seal 45, such as for example: (1) an additional flow channel positioned in housing 40 (tool collar); or (2) a leakage in seal 45. In alternatives, the bypass allows from about 0.1% to about 10% of the drilling mud to bypass the orifice 42 and opening 44.

Actuator 48 of FIG. 2 is generally cylindrical, which forms an annular space 51 between actuator 48 and inner surface of housing 40. A collar 52 is shown disposed at an end of actuator 48 proximate its connection to stem 50. Collar 52 has an annular configuration and extends radially in the annular space 51. An end of housing 40 distal from orifice 42 is closed to define a bulkhead 54 which extends radially between sidewalls of housing 40. An end of actuator 48 opposite plug member 46 axially abuts bulkhead 54. In an embodiment, actuator 48 is fixedly connected to bulkhead 54. Drilling mud DM is shown flowing through opening 44 across plug member 46 and through passages 56, 58 formed axially through collar 52 and bulkhead 54 respectively. Bulkhead 54 provides an axial backstop or support for actuator 48 in response to the flow of drilling mud DM, which interferes with actuator 48 movement in an axial direction when an axial force is acting on the actuator 48. Bulkhead 54 provides an operative connection between the actuator 48 and the outer housing 40. Outer housing 40 is part of the BHA 35. Orifice 42, collar 52, actuator 48, and bulkhead 54 are not limited to the cylindrical shape or circular (annular) shape, respectively, and in alternatives have edges (such as having a rectangular cross section or having a polyangular cross section in a plane perpendicular to the axis Ax).

Still referring to FIG. 2, supporting sidewall(s) 59 of orifice 42 transition radially outward at the lower terminal end of opening 44 and have lower or downstream ends that are supported on collar 52. The supporting sidewall(s) 59 is a connecting portion between orifice 42 and collar 52 providing a mechanical connection between both. As shown, supporting sidewall(s) 59 is an annular member circumscribing plug member 46, and having axial ends extending between orifice 42 and collar 52. Supporting sidewall(s) 59 provide a medium for force transfer from the orifice 42 to the collar 52, without interfering with movement of the plug member 46 along axis Ax. In an example, an upper end of supporting sidewall(s) 59 is fixedly connected to a lower end of orifice 42, or alternatively removably connected to the lower end of orifice 42. A lower end of supporting sidewall (s) is fixedly connected to an upper end of collar 52, or alternatively is removably connected to the upper end collar 52. Fixedly connected includes a threaded connection, gluing, welding, or the like. Removably connected includes an abutting connection. In an alternative, an interfering structure is between the lower end of the orifice 42 and the upper end of the supporting sidewall(s) 59, or the upper end of the collar 52 and the lower end of supporting sidewall(s) 59, respectively. Examples of an interfering structure include be a spacer ring or the like. Collar 52 has a centralizing function for the actuator 48 in housing 40. Orifice 42, collar 52, and supporting sidewall(s) 59 are moveable relative to housing 40. Plug member 46 is moved by actuator 48 relative to housing 40 and relative to orifice 42, supporting sidewall(s) 59, collar 52, actuator 48, and bulkhead 54. The lower end of actuator 48 distal to the plug member 46 is fixedly connected to housing 40 through bulkhead 54. A lower end of collar 52 is abutting an upper end of actuator 48 and is configured to transfer a force onto actuator 48. In an alternative embodiment, collar 52 is attached or fixedly connected to actuator 48. As described in more detail below, supporting sidewall(s) 59 transfers forces exerted by the drilling mud DM onto the orifice 42 to actuator 48 via collar 52. In one specific embodiment, orifice 42, supporting sidewall(s) 59, and collar 52 are fixedly connected to each other, alternatively, these parts form one integral part. In this embodiment collar 52 is fixedly connected to actuator 48, so that orifice 42, supporting sidewall(s) 59, collar 52 move together relative to housing 40 and this way apply a force onto actuator 48. Actuator 48 cannot move relative to housing 40 due to bulkhead 54. An optional flow meter 60 is schematically depicted within inner bore 24 upstream housing 40 and upstream of actuator 48, in alternatives flow meter 60 is mounted within housing 40 or may be located downstream of actuator 48. In the example, flow meter 60 is depicted as a turbine flow meter and made up of a number of blades that are attached to a shaft situated coaxially with axis Ax. In the embodiment shown, the blades create rotation of the shaft in response to the flow of fluid (drilling mud DM). Monitoring a speed of rotation (rotations per minute (RPM)) of the shaft provides an estimate of a flowrate of the flowing fluid. In an embodiment the flowrate is measured by a turbine wheel of a generator (not shown) located in the BHA 35 for power generation purposes. In embodiments supporting sidewall(s) 59 are made from one integral piece, or optionally made from more than one integral piece, such as half shells. The sidewall(s) 59 include embodiments that are interrupted to spare weight, and optionally have any form that is configured to transfer a force from the orifice 42 to the collar 52, or to the actuator 48.

Further illustrated in FIG. 2, is a sensor or measurement device 62 mounted on or within housing of actuator 48. In examples, sensor 62 senses the axial force F exerted onto actuator 48 generated by flowing the drilling mud DM through the inner bore 24 of the drill string 18, through orifice 42, over plug member 46, and through collar 52. The force sensed by the sensor 62 are drag forces acting on components of the valve assembly 22. Sensor 62 optionally includes a temperature sensor, which alternatively allows for temperature compensation of the axial force F measurement data provided by the sensor 62. Contributions to the force F measured by the force sensor 62 include a force $F_O$ exerted onto orifice 42 and a force $F_P$ exerted onto the plug member 46. The force $F_O$ exerted onto orifice 42 from the flow of drilling mud DM is transferred onto actuator 48 by virtue of supporting sidewall(s) 59 that are fixedly connected to collar 52, and wherein collar 52 is attached to actuator 48. The force $F_P$ exerted onto plug member 46 from the flow of drilling mud DM is transferred onto actuator 48 through stem 50. The total force F detected by sensor 62 is $F=F_O+F_P$. In alternate embodiments, sensor 62 or another sensor (not shown) is mounted in housing 40 for sensing an axial force exerted onto housing 40. In such an embodiment the force transferred onto actuator 48 is transferred via bulkhead 54 onto housing 40 where it is detected by a force sensor equivalent to the force detection by sensor 62 in actuator 48. The stem 50 is moved by the actuator to move the plug member 46. The force $F_P$ acts on the actuator 48 while the actuator 48 works against the force to keep the plug member 46 in the specific position and prevent the stem 50 from being pushed back into the actuator 48 and away from the valve seat 49. This way the force on the plug member 46 is transferred through the stem 50 to the actuator 48 and detected by the sensor 62.

In a nonlimiting example of operation, a density of the drilling mud DM is estimated by spacing the plug member 46 a distance $D_1$ or $D_2$ from the downstream end of opening 44 (referred to herein as a "set distance") and with sensor 62 sensing the force exerted by drilling mud DM onto orifice 42 and plug member 46. In examples, sensor 62 is made up of a strain gage which emits signals in response to strains within the housing of actuator 48. These signals are decoded to obtain a value that is representative of the force exerted onto actuator 48 or housing 40, respectively, from the flow of drilling mud DM. Having values of the measured force (from sensor 62), the drilling fluid flowrate, and the set distance, historical data is then consulted to identify a density of the drilling mud DM. The actuator 48 undergoes a length variation due to the axial force acting on the actuator 48. The axial force leading to a compression (reduction of the axial length) of the actuator 48 is detectable by the force sensor 62. The strain gage is optionally connected to the actuator 48 or housing 40 in various ways that allow proper detection of the compression of the actuator 48. In alternatives, the strain gage is glued, welded, or sputtered to the actuator 49. Instead of using a strain gage, in embodiments, the force is detected by a piezoelectric force sensor, by an optical force senor, by a load cell, or by a hydraulic force meter located at or in the actuator housing and between the actuator and the bulkhead 54, respectively.

Referring now to FIG. 3, shown is a graph 64 having an ordinate 66 which represents force F (FIG. 2) exerted by the drilling mud DM onto the orifice 42, and plug member 46. An abscissa 68 is included in graph 64, which represents values of the set distances $D_1$, $D_2$ (FIG. 2), i.e., the distance from the plug member 46 to the lower end of the opening 44 or the valve seat 49. A family of plots $70_{1-3}$ are included in graph 64 that represent flows of different drilling muds taken at different times, with the same flowrate q, but with drilling muds of different densities ρ. In the example shown, plot $70_1$ represents a drilling mud having a first density $ρ_1$ greater than the densities of drilling muds whose forces measured at set distances $D_1$, $D_2$ are represented by plots $70_{2,3}$. Similarly, plot $70_2$ represents a drilling mud having a second density $ρ_2$ greater than the density of a drilling mud whose forces measured at set distances $D_1$, $D_2$ are represented by plot $70_3$. Plot $70_3$ represents a drilling mud having a third density $ρ_3$ smaller than the density of the drilling muds whose forces measured at set distances $D_1$, $D_2$ are represented by plots $70_{1,2}$. The distances $D_1$, $D_2$ from the seating area of the plug member 46 to the valve seat 49 of the orifice 42 is measured along axis Ax (FIG. 2). It is to be understood that examples exist in which the set distances are measured from any defined reference location on the plug member 46 along the axis Ax to any defined reference point on the orifice 42, such as the seating area on the plug member 46 and the orifice 42, or the upper end of the plug member 46 along axis Ax to the lower end of the orifice 42, or the lower end of the plug member 46 along axis Ax to the lower end of the orifice 42.

Shown in FIG. 4 is a graph 72 created by consolidating data from FIG. 3. In graph 72 is an ordinate 74 that represents mud density and an abscissa 76 representing force difference(s) ΔF (FIG. 3) between a first force $F_1$ measured at first set distance $D_1$ and a second force $F_2$ measured at a second set distance $D_2$. In alternatives, a distance or movement of the plug member 46 (FIG. 2) between the first set distance $D_1$ and the second set distance $D_2$ is referred to as a given travel ΔD. The given travel ΔD in FIG. 3 results from $D_2$–$D_1$. Plot 78 of graph 72 graphically represents force difference(s) ΔF measured for each of the drilling muds represented by plots $70_{1-3}$, when the plug member 46 is at the first set distance $D_1$ and again after being moved by the given travel ΔD to the second distance $D_2$. As illustrated in plot 78 is that for the given travel ΔD of the plug member 46, the corresponding force difference ΔF increases with an increasing density of the drilling mud. Using the force difference instead of a single force measurement eliminates from the force data small contributions of drag forces acting on other components of the valve assembly, such as collar 52 or outer surface of actuator 48. These force contributions cause a background force that contributes to every force measurement in the same fashion. In alternatives, the density of the drilling mud is determined based on a single force and a single set distance by using the same apparatus and method described herein. In this case the background force is either neglected or otherwise corrected for, such as by a mathematical correction.

In an example, a physical test of an embodiment of a valve assembly 22 (FIG. 2) is conducted in a controlled environment, such as a test bench, in a wellbore, or another location where different flows of drilling mud DM are directed through the valve assembly 22; and in which the different flows are at substantially the same flowrate, but with drilling muds having different densities that are known. Further in this alternative, sensor 62 (FIG. 2), or another suitable device, is used to measure values of force F when plug member 46 is located at the first and at the second set distances $D_1$ and $D_2$—which selectively yields force differences ΔF. Optionally, flows of drilling mud are mathematically modeled, simulated or calculated, also referred herein as calculated using mathematical algorithms. Values of forces $F_1$ and $F_2$ (and force differences ΔF) are obtained using the mathematical algorithms based on known fluid dynamic evaluation methods, which is within the skills and capabilities of one skilled and without undue experimentation. Further in this example, example graphs the same or substantially the same as graphs 64, 72 are created based on results obtained by the physical testing and/or the mathematical algorithms.

In an example, physical tests and/or mathematical algorithms (as described above) are conducted and/or generated over a range of different flowrates and/or different densities of drilling mud. Additional measured and/or calculated values, using the mathematical algorithms, of force $F_1$ and force $F_2$ (with the plug member 46 at the first and second set distances $D_1$ and $D_2$) are obtained from the additional physical tests and/or mathematical algorithms. In examples, conducting the physical tests and/or performing the mathematical algorithms generates historical data, where the historical data contains values conveying information describing characteristics of flows of drilling mud flowing through the valve assembly 22. For the purposes of discussion herein, a flow of drilling mud refers to a volume of a drilling mud flowing through the valve assembly 22 at a particular flowrate and having a particular density; and for each flow of drilling mud, forces $F_1$ and $F_1$ are measured/calculated when the valve plug member 46 is at a particular set distance $D_1$ and at a particular given travel ΔD from the set distances $D_1(D_2)$. An embodiment of the historical data includes data sets of values representing (1) a particular drilling mud flowrate q, (2) a particular drilling mud density ρ, (3) a first set distance $D_1$, (4) a given travel ΔD, (5) a force $F_1$ exerted onto the valve assembly 22 by the flow of drilling mud at the particular flowrate q and particular density ρ when the plug member 46 is at the first set distance $D_1$, and (6) a force $F_2$ exerted onto the valve assembly 22 by the flow of drilling mud at the particular flowrate q and particular density ρ when the plug member 46 is at the given travel ΔD away from the first set distance $D_1$, e.g. the plug member is at second set distance $D_2$. Values or data making up data sets for a particular flow of drilling mud is referred to as correlated data. The testing/calculating optionally includes flowrates ranging from below to above that of flowrates anticipated in operation of a wellbore having or expected to have the valve assembly 22 installed (typically 100 gpm to 1500 gpm). In further examples, the set distance $D_1$ has a minimum of zero (i.e., the plug member 46 being in contact with the opening 44 or the valve seat 49), and the given travel ΔD has a maximum value limited by the location of the collar 52 or the length of the stem 50. In examples, the set distance $D_1$ and/or given travel ΔD varies depending on the flowrate of the flow of drilling mud, and/or density of the flow of drilling mud.

For the purposes of discussion herein, the term "real-time" refers to matter, conditions, characteristics, etc., within the wellbore 12 and/or during operation of the wellbore 12. In a non-limiting example, a density of a real-time flow of drilling mud flowing through the valve assembly 22 is estimated by comparing real-time information or data (e.g., to the flow of drilling mud in a wellbore 12) with historical data, identifying a data set of historical data closest to the real-time data, and selecting the drilling mud density from the historical data set to be the density of the real-time drilling mud. In this example, a flow of drilling mud DM is directed through the valve assembly 22 (FIG. 2), a flowrate (volumetric flowrate) of the flow of drilling mud DM is sensed by flow meter 60. Plug member 46 is disposed at first and second positions (first set distance $D_1$, and second set distance $D_2$) that are spaced away from opening 44, and the value of the first force $F_1$ is sensed by sensor 62 while plug member 46 is at the first position, and the value of the second force $F_2$ is sensed by sensor 62 while plug member 46 is at the second position. In an alternative, the first position is a set distance D from opening 44, and second position is a given travel ΔD from distance D, and vice versa. In this example, a force difference is obtained by finding a difference in the values of the first force $F_1$ and the second force $F_2$, the flowrate is a real-time flowrate $q_r$, the force difference is a real-time force difference $\Delta F_r$, the set distance $D_1$ is a real time set distance $D_r$, and the given travel is a real time given travel ΔD. Historical data is then consulted, and a data set of correlated data within the historical data (historical data set) is identified having the same or substantially the same historical flowrate $q_h$, historical force difference $\Delta F_h$, historical set distance $D_h$, and historical given travel $\Delta D_h$ as the real time flowrate $q_r$, real time force difference $\Delta F_r$, real time set distance $D_r$, and real time given travel $\Delta D_r$ (real time data). The density of the drilling mud flowing real time through the valve assembly is estimated to be the same as the density of the drilling mud that is within the historical data set that correlates with the real time data. Optionally, and as noted above, the historical data is represented in graphs the same as or substantially similar to graphs 64, 72, and are consulted and the real-time density of the drilling mud is estimated based on a plot the same as or similar to plot 78 and based on the historical data relationship between force difference and drilling mud density at a particular flow rate. In an alternative embodiment the historical data is represented in a lookup table, stored in a memory. and accessible to the processor used in the real-time application (such as the downhole processor). In yet another embodiment the historical data is calculated, using the processor and the mathematical algorithms, based on the parameters used in the real-time measurement (set distance, given travel, flow rate).

Referring back to FIGS. 1 and 2, included with valve assembly 22 is a downhole processor or controller 80 (FIG. 2) in communication with flow meter 60 and sensor 62 and configured to estimate a real-time density of drilling mud based a correlation of real-time and historical data and as outlined herein. Processor/controller 80 is optionally in communication with a processor/controller 82 shown on surface 16, examples exist in which processor/controller 80, 82 are the same type of device, or they are part of the same device. Processor/controller 80, 82 are each further configurable to monitor and/or provide command signals for wellbore operations. Processor/controller 80, 82 optionally includes memory 83, examples of which include non-transitory computer-readable storage medium having stored thereon, one or more of executable code, operating instructions, control information, data and database records. Examples of executable code include a set of instructions that causes processor/controller 80, 82 to perform operations, such as receiving signals, generating and sending signals, where the signals include commands for operation of components (including those disclosed herein), and performing mathematical computations. In alternatives, memory 83 is separate from processor/controller 80, 82 and connected for communication or integral with processor/controller 80, 82, and includes one or more of a computer diskette, magnetic tape, conventional hard disk drive, electronic read-only memory, optical storage device, any appropriate data storage device having a non-transitory computer readable storage medium stored thereon, and a server. Communication between processor/controller 80 and processor/controller 82 is optionally through communication means 84, examples of which include hardwired, wireless, fiberoptic, telemetry techniques described above, and the like. In examples, historical data is stored in processor/controller 80, and/or processor/controller 82, and/or other digital storage media (not shown). In examples, decisions for operating the drill string 18 are based on knowledge of real-time density of the drilling mud, such as changes to the rate of penetration, direction of the drilling, the direction of the drilling trajectory (azimuth, inclination), the drill string rotations per minute, the drilling mud flow rate, the drilling mud density, the weight on bit, replacement of the drill bit, etc. Further shown in FIG. 1 is an optional pressure transducer 85 that is mounted within wellhead assembly 38 and in selective communication with wellbore 12.

In a further alternative, valve assembly 22 operates as a mud pulser, and the plug member 46 is reciprocated axially with respect to the opening 44 to form pulses of pressure in the flow of drilling mud DM circulating through the wellbore 12. In this example, communication from within the wellbore 12 to surface 16 is performed by telemetry through operation of the valve assembly 22. The valve assembly 22 generates pressure pulses in the flowing drilling mud inside the inner bore of the drill string 18. The pressure pulses propagate from the location of the mud pulser inside the drill string 18 to the surface. The pressure pulses are detected at a surface location or near the surface location by a pressure transducer 85. To guarantee reliable communication by pressure pulses between the valve assembly 22 and the pressure transducer 85 at the surface, a sufficient pressure drop generated by the valve assembly 22 is required. The pressure drop defines the pressure variation of a pressure pulse caused by the reciprocating plug member 46. The pressure pulse includes a minimum pressure (valve assembly open position ($D_2$), flow not obstructed by plug member 46) and a maximum pressure (valve assembly closed position ($D_1$), flow obstructed by plug member 46) the difference is the pressure pulse height. The pressure pulse height is large when the pressure drop in the valve open position is large. Valve assembly closed position refers to a minimum plug member distance to the valve seat 49 in orifice 42 in the reciprocating movement along axis Ax of the plug member 46. Valve assembly open position refers to a maximum plug member distance to the valve seat in orifice 42 in the reciprocating movement along axis Ax of the plug member 46. Performing a real-time estimation of the density of the drilling mud as described earlier by usage of a force measurement in the valve assembly, a real-time estimation of the pressure drop becomes possible. The pressure drop ΔP depends on the density of the drilling mud. Determining the density of the drilling mud in real-time allows for estimating the pressure drop in real-time. The force measurement is performed while the plug member 46 of the valve assembly 22 is reciprocating to generate the pressure pulses. That is, the force sensor 62 measures the forces experienced by the orifice 42 and the plug member 46 at the different set distances $D_1$ and $D_2$ of the plug member 46 while the plug member is toggling between the positions $V_1$ and $V_2$ to generate the pressure pulses. The density of the drilling mud is determined, and the pressure drop is calculated or determined from historical data. Based on the determined pressure drop the pressure drop is adjusted to a desired value.

In alternatives, the pressure drop ΔP across the valve assembly, or the pressure drop across the orifice, is estimated from the force F measurement performed by sensor 62. The pressure drop can be estimated by using equation P=F/A wherein P is the pressure, F is the force and A is the pressure affected area. The pressure affected area A is the upstream surface area 86 of the orifice 42 and the upstream surface area 87 (axially projected surface area) of the plug member 46 facing uphole (upstream surface area of the plug member). Further in this alternative, with the estimated pressure drop ΔP and a known flowrate q of the flow of drilling mud DM, the density ρ of the drilling mud DM can be calculated by Equation 1 below:

$$\rho = \frac{2 * \Delta P * a^2}{C_v * q^2} \quad \text{Eqn. 1}$$

Figure 6:
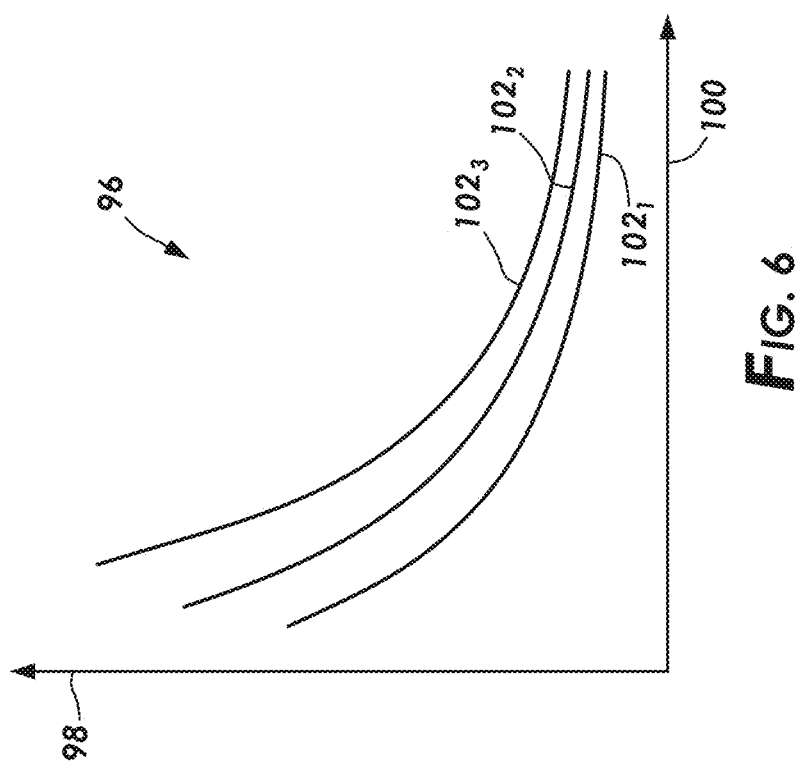
FIG. 6 is a graph of example pressure drops versus different set distances in the valve assembly of FIG. 1, and for drilling muds with different densities at a constant flow rate.
Figure 5:
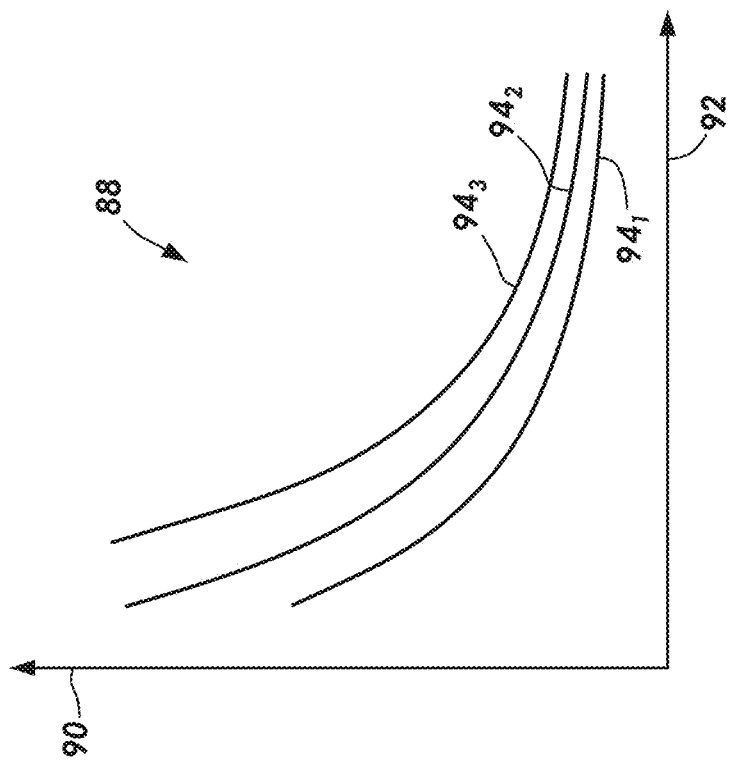
FIG. 5 is a graph of example pressure drops versus different opening values in the valve assembly of FIG. 1, and for drilling muds with different flowrates.

Flow restricted area a, and valve coefficient $C_v$, are specific to valve assembly 22 for a specific set distance ($D_1$ or $D_2$) of the plug member to the valve seat, and it is within the capabilities of those skilled to measure or calculate these values. The flow restricted area a is defined by the area the plug member 46 leaves for the flow of drilling mud to flow out of opening 44 and along the plug member 46. The flow restricted area a varies when the set distance varies. Pressure drop ΔP of a flow of drilling mud DM flowing through valve assembly 22 is dependent on flow rate q, density ρ of the drilling mud, and position (or set distance D) of the plug member 46. Graphically illustrated in FIG. 5 is a graph 88 (similar to graph 64 in FIG. 3), having an ordinate 90 representing a pressure drop of drilling mud DM across valve assembly 22 (FIG. 2), an abscissa 92 representing a position of plug member 46, and a family of curves $94_{1-3}$. Each of the curves $94_{1-3}$ represent a flow rate of drilling mud DM, and how the position of the plug member 46 affects a pressure drop of the mud flow. The flowrate represented by curve $94_2$ exceeds the flowrate represented by curve $94_1$, and the flowrate represented by curve $94_3$ exceeds the flowrate represented by curve $94_2$. The densities of the drilling muds represented by each of curves $94_{1-3}$ are the same. A graph 96 is shown in FIG. 6 similar to graph 88 of FIG. 5, which has an ordinate 98 representing a pressure drop of drilling mud DM across valve assembly 22, an abscissa 100 representing a position of plug member 46, and a family of curves $102_{1-3}$. In FIG. 6, the flowrates of drilling mud DM represented by curves $102_{1-3}$ are the same, but the densities of the drilling mud DM is different in each of the curves $102_{1-3}$, i.e., the density represented by curve $102_2$ exceeds the density of the drilling mud DM represented by curve $102_1$, and the density represented by curve $102_3$ exceeds the density of the drilling mud DM represented by curve $102_2$. Graphs 88 and 96 are selectively created having pressure drop ΔP across the valve assembly 22 versus set distances, so that a real-time drilling mud density is estimated based on historical data having historical pressure drop data $\Delta P_h$ estimated based on historical force difference data $\Delta F_h$. In examples, the flow restricted area a is quantified based on converting values of the above described set distances $D_1$, $D_2$ (FIG. 2). Shown in FIG. 5 is the dependence of the pressure drop from mud density ρ, flow rate q, and set distances. Determining the density of the drilling mud DM by a force measurement as described earlier, allows determination of the pressure drop for a specific plug member position (set distance). In an example, the flow rate is known from a flow measurement (such as obtained by a flow meter). Determining the pressure drop in real-time $\Delta P_r$ provides opportunity to detect an inefficient real-time pressure drop (pressure drop too small or too big) used in the communication between the downhole location and the surface. Having detected an insufficient pressure drop an adjustment of the set distance ($D_1$ and/or $D_2$) can be performed to optimize the pressure drop to a desired pressure drop, such as for example 20 bar or any other suitable pressure drop value. Graphs 88, 96 in FIGS. 5 and 6 further allow identification of how to adjust the set distances $D_1$ and $D_2$ and/or the given travel ΔD to achieve the desired pressure drop. Examples of adjustment include varying either $D_1$ or $D_2$ or both or varying given travel ΔD. The adjustment of the pressure drop to the desired pressure drop is optionally performed based on historical data by correlating or comparing the real-time measured force difference(s) with the historical data and determining how to adjust valve assembly operating parameters to achieve an optimized pressure drop. In one example, the measured force difference(s) is communicated to the surface, such as to the controller 82, to determine the mud density and pressure drop at surface and to possibly instruct the valve assembly 22 in the wellbore 12 via telemetry (downlink) to adjust the valve assembly operating parameters (e.g., the set distance(s), data rate (plug member reciprocation or oscillation frequency)). Alternatively, the pressure drop is calculated downhole by the downhole controller 80 and the valve assembly operating parameters are adjusted downhole automatically without the interaction of a human being. Controller 82 or 80 optionally determines the pressure drop directly from the force difference(s) without outputting the density of the drilling mud during the determination. Further in this example, the determination of the pressure drop from the force difference(s) is performed using the historical data represented by one or more of graphs displayed in FIGS. 3-6.

In an example of use, pressure drop through the valve assembly 22 is controlled, and without direct calculation of the density of the drilling mud. In this example, force F is measured by sensor 62 while plug member 46 is at a set distance ($D_1$ or $D_2$) and/or a given travel ΔD, and pressure drop through the valve assembly 22 is calculated by controller 80 (FIG. 2) and/or controller 82 (FIG. 1), and where the pressure drop calculation is based on a real-time flowrate of a flow of drilling mud DM, valve characteristic charts, the set distance and given travel, and the values of force F measured by sensor 62. FIG. 3 is an example of a valve characteristic chart, in alternatives, a valve characteristic chart graphically represents pressure versus set distance or given travel. Controller 80 and/or controller 82 calculates a new set distance and given travel to adjust the pressure drop to a target value. In further alternative, the measured force F is used for condition monitoring of the valve assembly 22, such as when being operated as a mud pulse system, to detect if there are plugs in the circulation of the flow of drilling mud DM or if there is erosion in hardware handling the flow of drilling mud DM. Optionally, the pressure drop is calculated multiple times during a period of time, and is compared to a reference signal or historical data, stored in a lookup table; or which is optionally calculated or modeled mathematically. Examples of the period of time include one hour, five hours, ten hours, 50 hours, 100 hours, and any value between 1-100 hours In alternative applications the measured force F is used to detect pressure events in the drill string 18 not related to the valve assembly 22, such pressure drops generated by an axial movement of a rotor in a mud motor (not shown), a jar (not shown), or other tools generating a variation in axial load. In a non-limiting example of operation, when a force measurement indicates a pressure event (such as an excursion from an expected pressure) in the wellbore 12, or a pressure drop generated by the mud pulser 22 is not sufficient for reliable data communication, an alert is optionally generated by the processor 82 at the surface 16. The alert indicates to an operator that a mitigating action is required. Examples of mitigating action include a change of operational parameter as described earlier (e.g.

change of rate of penetration). A pressure drop insufficient for reliable data communication is identifiable by one skilled in the art.

Figure 7:
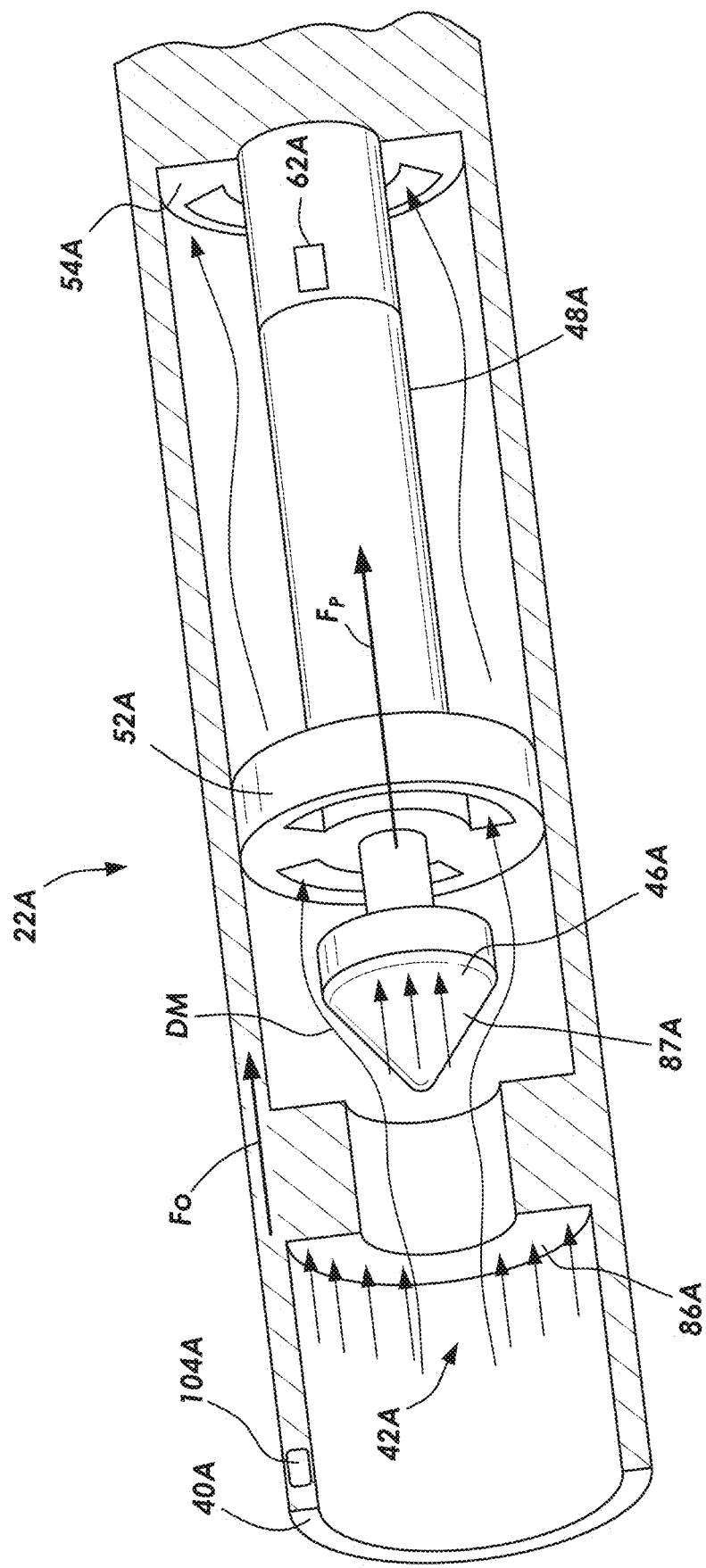
FIGS. 7 and 8 are side partial sectional view of alternate embodiments of the valve assembly of FIG. 1.

Shown in a side partial sectional view in FIG. 7 is a second example embodiment of valve assembly 22A, in which both orifice or flow restrictor 42A and bulkhead 54A are integrally formed within housing 40A. In this embodiment there are no sidewalls extending axially from a downstream end of orifice 42A. Further included in the valve assembly 22A of FIG. 7 is a force sensor or force measurement device 104A shown disposed in sidewalls of or mounted on housing 40A. Collar 52A is moveable relative to housing 40A, orifice 42A and bulkhead 54A. The force $F_O$ exerted onto upstream surface area 86A of orifice 42A and the force $F_P$ exerted onto upstream surface area 87A of plug member 46A is detected by force sensor 104A. In the alternative embodiment of FIG. 7, force $F_P$ exerted onto upstream surface area 87A of plug member 46A is measured by sensor 62A that mounts onto actuator 48A. The force measured by force sensor 104A ($F=F_O+F_P$) is larger than the force measured by sensor 62A ($F=F_P$) and therefore easier detectable. However, readings at force sensor 104A are affected by loads acting otherwise on the housing 40A (e.g. varying WOB, bending of the BHA, etc.). In an embodiment, force sensors 62A and/or 104A are in communication with a processor (not shown) that optionally includes a memory. A flow meter (not shown) is optionally mounted in the bore of housing 40A and in communication with the processor, and measures the flowrate of the flowing drilling mud DM. The force F is measured at two different set distances ($D_1$ and $D_2$) of plug member 46A as described with FIG. 2 to improve the force measurement and eliminate the background force. In an alternative embodiment, the force is optionally measured at force sensor 104A and force sensor 62A to determine a resulting force and improve the measurement.

Figure 8:
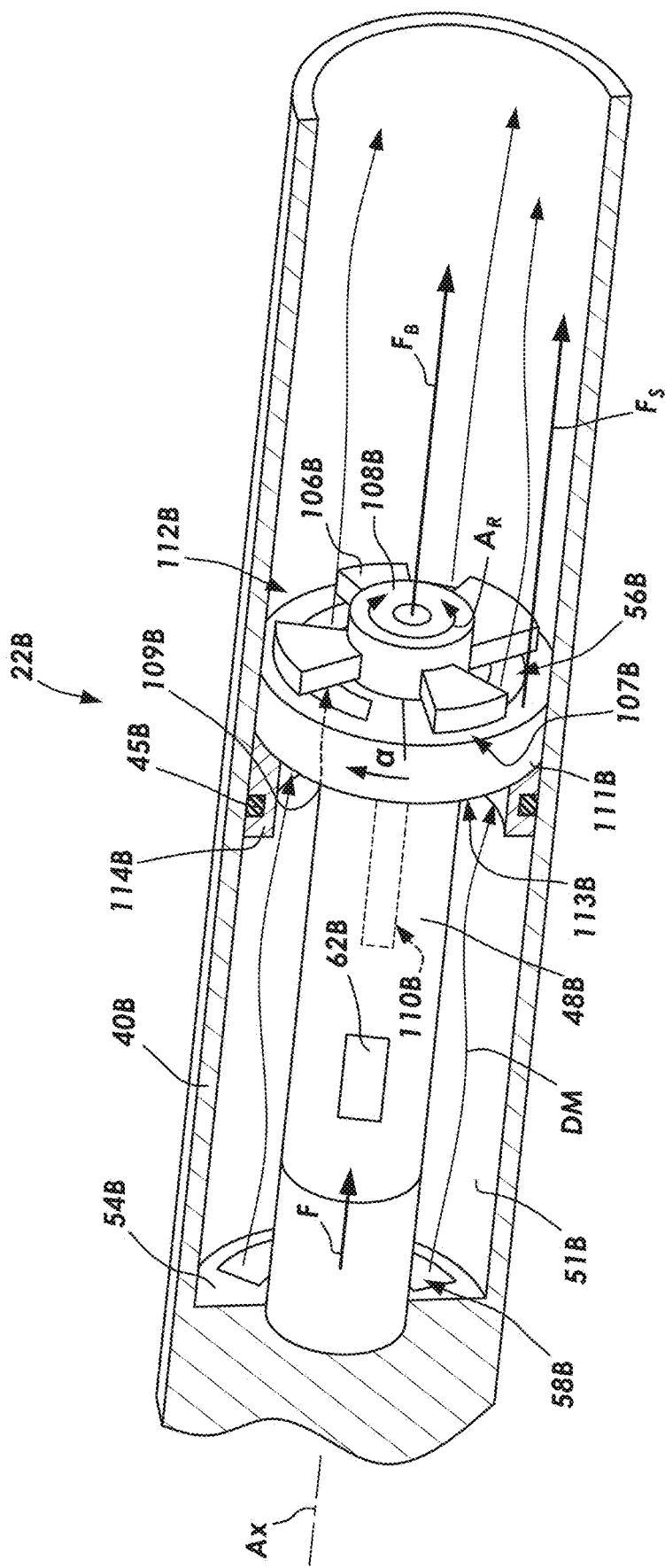

A third alternate embodiment of valve assembly 22B is shown in a side partial sectional view in FIG. 8, and which includes a rotating shear valve. In this example, an actuator 48B rotationally drives a drive shaft 110B (shown in phantom view). The drive shaft 110B extends from inside the actuator 48B through a stator 111B and connects to a rotor disc 112B at the downstream side of the stator 111B. In this embodiment, stator 111B operates as a flow restrictor, and the rotor disc 112B operates as a plug member. Drive shaft 110B is rotated by actuator 48B to be rotatable with respect to stator 111B, and axially affixed to actuator 48B so that drive shaft 110B is substantially axially static relative to stator 111B. The stator 111B includes a plurality of fluid passages or openings 56B that extend axially therethrough. The rotor disc 112B includes a plurality of blades 106B that orbit about axis Ax with rotation of rotor disc 112B to selectively obstruct fluid flow through the openings 56B of stator 111B. In examples, the rotor disc 112B rotates in the same direction, rotates in alternating directions, rotates at a constant rotational velocity, rotates at varying rotational velocities, rotates in an oscillatory fashion, or combinations thereof. Bulkhead 54B is disposed uphole (upstream) of shear valve assembly 22B and fixedly connects actuator 48B with housing 40B. Drilling mud DM flows through passages 58B in bulkhead 54B and along actuator 48B before reaching openings 56B in stator 111B and impinging on upstream facing surfaces of blades 106B. The drilling mud DM follows a path within housing 40B (tool collar and part of BHA 35) that extends axially through annular space 51B and through openings 56B of stator 111B; after exiting openings 56B the drilling mud DM flows into the downstream end of valve assembly 22B. Blades 106B of rotor disc 112B are generally planar members that are oriented substantially perpendicular to axis $A_X$. Radial inward ends of blades 106B mount to an outer circumference of a hub 108B, which is set adjacent the downstream facing surface of stator 111B and is connected to another end of the drive shaft 110B opposite to the end that is connected to the actuator 48B. Hub 108B and blades 106B form the rotor disc 112B. There is an axial gap 107B between the stator 111B and the rotor disc 112B so that the rotor disc 112B can freely rotate relative to the stator 111B. In a non-limiting example of operation, drive shaft 110B is rotated by an angle α as illustrated by arrow $A_R$, such as by actuation of a motor (not shown) in actuator 48B. Rotation or oscillation of drive shaft 110B and attached rotor discs 112B selectively rotates or oscillates blades 106B into positions that are fully in, partially in, or fully out of the flow path of drilling mud DM exiting the downstream end of openings 56B. When fully or partially in the drilling mud flow path, the blades 106B interfere with the drilling mud DM flowing through the openings 56B, which generates an axial force FB on blades 106B. The force on blades 106B is exerted on an upstream surface area 109B of the blades 106B and is related to the size of the surface area that is exposed to the flow of drilling mud. The force on the blades 106B is increasing with the portion of the opening 56B obstructed by the blades 106B. That is, the more the rotor disc 112B and the blades 106B rotate toward the position that fully overlap the openings 56B (fully in, valve fully closed), the greater the force $F_B$ on the blades 106B. The more the blades 106B rotate into positions that fully overlap the openings 56B, the more the flow restricted area is reduced, the flow restricted area a (Eqn. 1) is defined by the portion of the openings 56B that is left open for the flow of drilling mud to flow through the stator 111B. The flow restricted area a is at a maximum when the openings 56B are not obstructed by the rotor disc 112B and where the blades 106B do not overlap with the openings 56B (fully out, valve fully open). As described with the earlier embodiments, at least one force measurement is required to determine the density of the drilling mud DM. However, making two force measurements at two different flow restricted areas a, or two different rotational positions of stator 111B and rotor disc 112B relative to each other, enables for elimination of the background force. Different rotational positions of the rotor disc 112B relative to the stator 111B are represented by different rotation angles α of the rotor disc 112B. In one example, a force measurement is performed at rotation angle α1 and at rotation angle α2. In the α1 position of the rotor disc 112B, maximum angular widths of the blades 106B are disposed between rearward and forward angular ends of the openings 56B. In the α2 position of the rotor disc 112B, the area of the blades 106B directly downstream of the openings 56B is less than while in the α1 position. Accordingly, in the α2 position the blades 106B obstruct the flow of drilling mud through openings 56B more than in the α2 position. The rotational positions α1 and at α2 correspond to two different restricted areas. The upstream surface areas of single blades sum-up to a total upstream surface area 109B of all blades together and the force $F_B$ is the force exerted on the total upstream surface area. The stator 111B as well as the rotor disc 112B and the drive shaft 110B are axially movable relative to the housing 40B, while bulkhead 54B and actuator 48B are fixedly connected to housing 40B. The force $F_B$ exerted on the blades 106B by the flowing drilling mud DM pulls on the actuator 48B via the drive shaft 110B. Beside the force $F_B$ on the blades 106B the flow of drilling mud DM exerts a force $F_S$ on an upstream surface 113B of the stator 111B. Force F=Force $F_S$+Force $F_B$, which is transferred to actuator 48B and sensed by sensor or measurement device 62B. In example shown, the stator 111B is fixedly connected to the actuator 48B, and the rotor disc 112B is fixedly connected to actuator 48B via the drive shaft 110B. The stator 111B and the rotor disc 112B are not axially movable relative to each other. That is, when the stator 111B moves axially, the rotor disc 112B moves accordingly. With the rotor disc 112B the blades 106B are as well axially fixedly connected to the actuator 48B. That is, a movement of the stator 111B and/or the rotor disc 112B or blades 106B in axial direction due to forces $F_S$ and $F_B$ leads to an elongation of actuator 48B. The elongation is detected by force sensor 62B. The stator 111B optionally includes a sealing extension 114B on its upstream side. In the example shown, sealing extension 114B is an annular member having an outer surface adjoining an inner surface of housing 40B. In examples, an inner diameter of sealing extension 114B is radially past outer diameters of openings 56B. A seal 45B is set in a recess formed along an outer circumference of sealing extension. Sealing extension 114B is either integral with stator 111B or is fixedly connected to stator 111B. Sealing extension 114B is movable relative to housing 40B together with stator 111B. The seal 45B in sealing extension 114B prevents fluid leakage between the stator 111B outer circumferential surface and the inner surface of housing 40B. In an alternative embodiment, the seal 45B is placed in the circumferential surface of stator 111B facing the inner surface of housing 40B when the dimensions of the stator 111B leave sufficient space for a seal being integrated in the stator 111B. In this case no sealing extension 114B is required. The force sensor 62B is in communication with a processor (not shown) that optionally includes a memory. A flow meter (not shown) mounted in the bore of housing 40B and in communication with the processor measures the flowrate of the flowing drilling mud DM. Historical data, such as a lookup table (e.g. in the memory), are used to translate the measured force(s) into a density of the drilling mud or a pressure drop, as described earlier. Optionally, the density or the pressure drop can be calculated based on the measured force data. Examples of the valve assembly include a shear valve mud pulser generating pressure variations in a drilling mud for telemetry purposes. The rotational positions α1 and at α2 of the valve assembly are optionally used to produce a pulse sequence (α1 corresponds to a pressure increase in the drilling mud (pressure pulse), α2 corresponds to a base pressure (no pressure pulse)). The force measurement can be performed while the mud pulser is on operation and pressure coded telemetry data is transmitted. In an alternative embodiment the shear valve assembly 22B (stator 111B and rotor disc 112B) may be located upstream of the actuator 48B. In one more embodiment the rotor 112B only includes one blade 106B and the stator 111B only includes one fluid passage 56B. In yet another embodiment the force sensor may be positioned in the housing 40B similar with the earlier described embodiments.

Figure 9:
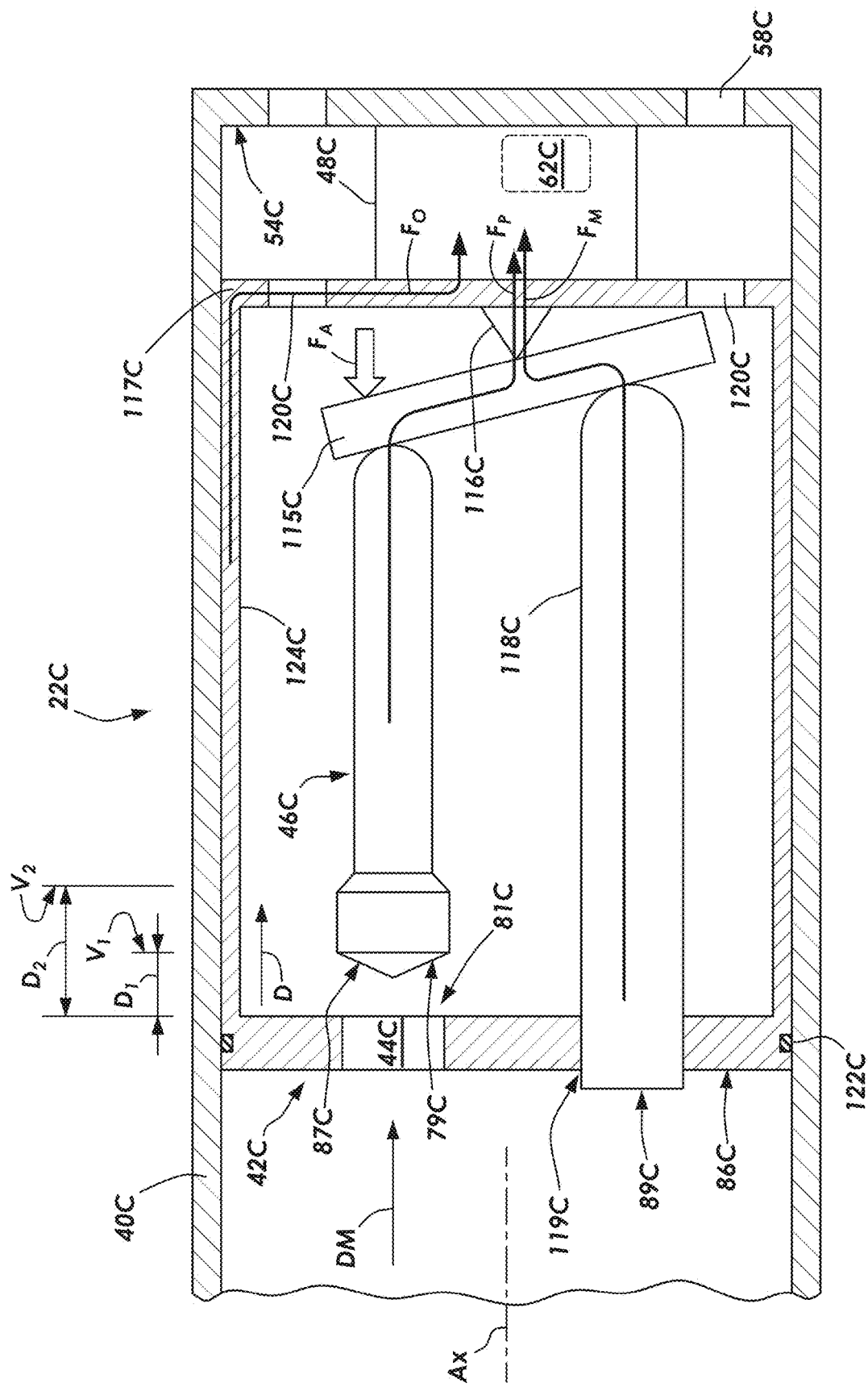
FIGS. 9 and 10 are side sectional schematic views of an example of operation of an alternate embodiment of the valve assembly of FIG. 1.

Schematically shown in a side sectional view in FIG. 9 is a fourth example embodiment of a valve assembly 22C, which includes an orifice or flow restrictor 42C on an upstream end of valve assembly 22C. This valve assembly is referred to herein as a force balanced reciprocating valve assembly ("FBR valve assembly"). A first opening 44C extends axially through orifice 42C at a location radially offset from axis $A_X$. Drilling mud DM flows along a path that is substantially parallel with axis $A_X$ and that passes through first opening 44C. Plug member 46C in FIG. 9 is an elongate member oriented lengthwise within housing 40C (tool collar and part of BHA 35) and aligned with a downstream end of first opening 44C to be in the path of drilling mud DM exiting first opening 44C. Orifice 42C optionally includes a valve seat 81C at the downstream end of first opening 44C and plug member 46C includes a seating area 79C configured to mate with the valve seat 81C when in a valve fully closed position. An end of plug member 46C opposite from seating area 79C is in abutting contact with a rocker 115C, which is shown as an elongate member oriented oblique with axis $A_X$. A mid-portion of rocker 115C pivots on a fulcrum 116B. A side of fulcrum 116C opposite rocker 115C is supported by an actuator 48C through a support member, such as a plate 117C, which is shown as a planar member oriented transverse to axis $A_X$. The plate 117C is connected to an upstream side of actuator 48C and includes fluid passages 120C for the drilling mud to pass through. An end of the actuator 48C opposite the end of the actuator that is connected to plate 177C is fixedly connected to the housing 40C through a bulkhead 54C. Bulkhead 54C includes opening 58C for the drilling mud to flow through. A sensor or a measurement device 62C is mounted on or in actuator 48C. Rocker 115C, fulcrum 116C and supporting plate 117C are a simplified representation of a more complex equivalent mechanical structure, such as for example a bevel gear that is operationally coupled to the actuator 48C. A downstream end of a piston 118C abuts an upstream facing surface of rocker 115C distal from its contact with plug member 46C. Piston 118C is an elongate member shown substantially parallel with, and radially offset from, plug member 46C. An upstream end of piston 118C projects through a second opening 119C formed axially through orifice 42C and radially offset from axis $A_X$ and opening 44C. The force exerted on the piston 118C by the flow of drilling mud DM is transferred to the plug member 46C through the locomotive connection of the rocker 115C and fulcrum 116C, and in an opposite direction to the force exerted by the flow of drilling mud DM onto plug member 46C. The force transferred from the piston 118C to the plug member 46C reduces the actuator force $F_A$ required from actuator 48C to drive the plug member 46C into opening 44C, so that the energy consumption of the actuator 48C (e.g., electrical motor) is reduced. A seal 122C is provided along the outer circumference of orifice 42C, which forms a fluid flow barrier between the orifice 42C and inner surface of housing 40C. Supporting sidewalls 124C are shown extending axially between orifice 42C and the plate 117C along the inner surface of housing 40C. Orifice 42C, supporting sidewall(s) 124C, plate 117C, and actuator 48C are fixedly connected to each other so that when orifice 42C, supporting sidewall(s) 124C, and plate 117C move axially due to the force $F_P$ applied on the plug member 46C, the force $F_M$ applied to the piston 118C, and the force $F_O$ applied to the orifice 42C, these components move together and exert a force F onto the actuator 48C, causing a compression of the actuator 48C (or a part of the actuator 48C). The actuator 48C is configured to drive rocker 115C ($F_A$) to move plug member 46C in a reciprocating manner to produce pressure pulses in the drilling mud DM. Forces $F_O$ and $F_P$ and $F_M$ are generated by the drilling mud DM impinging on an upstream surface area 86C of orifice 42C, upstream surface area 87C (axially projected surface) of plug member 46C, and upstream surface area 89C of piston 118C. Force $F_O$ extends axially along supporting sidewall(s) 124C and via plate 117C onto actuator 48C. Force $F_P$ passes axially along plug element 46C, onto rocker 115C, through fulcrum 116C and plate 117C. and force $F_M$ passes axially along piston 118C, onto rocker 115C, through fulcrum 116C and plate 117C onto actuator

48C. Sensor 62C detects force $F=F_O+F_P+F_M$. The force F is measured when plug member 46C is positioned so that there is a set distance D between the plug member 46C and the valve seat 81C in the opening 44C. The set distance D is representative for a restricted area of the valve assembly 22C. As explained earlier, the force F is optionally measured at two different set distances, $D_1$ and $D_2$, and the force difference $\Delta F$ is determined to eliminate any background forces. The force sensor 62C is in communication with a processor (not shown) that optionally includes a memory. A flow meter (not shown) mounted in the bore of housing 40C and in communication with the processor measures the flowrate of the flowing drilling mud DM. A memory in communication with the processor optionally stores a look-up table including historical data that is used to determine a density of the drilling mud based on the measured force F or the determined force difference $\Delta F$ and the flow rate. In an alternative embodiment the density is calculated using the measured force (or force difference) and the flow rate of the flow of drilling mud DM at a set distance D (or set distances). In an alternative embodiment the force sensor 62C is positioned in or on the plug member 46C instead of in or on the actuator 48C or positioned in combination with another force sensor (not shown) in or on the actuator 48C. In the latter embodiment the two force sensors increase measurement quality. An example of operation of the valve assembly 22C of FIG. 9 is found in Peters, U.S. Pat. No. 11,892,093 ("Peters '093"), which is assigned to the assignee of the present application and incorporated by reference herein in its entirety and for all purposes. In embodiments, the embodiment illustrated in FIG. 9 and described herein operates in substantially the same way, and using the substantially the same components as that described in Peters '093.

Figure 10:
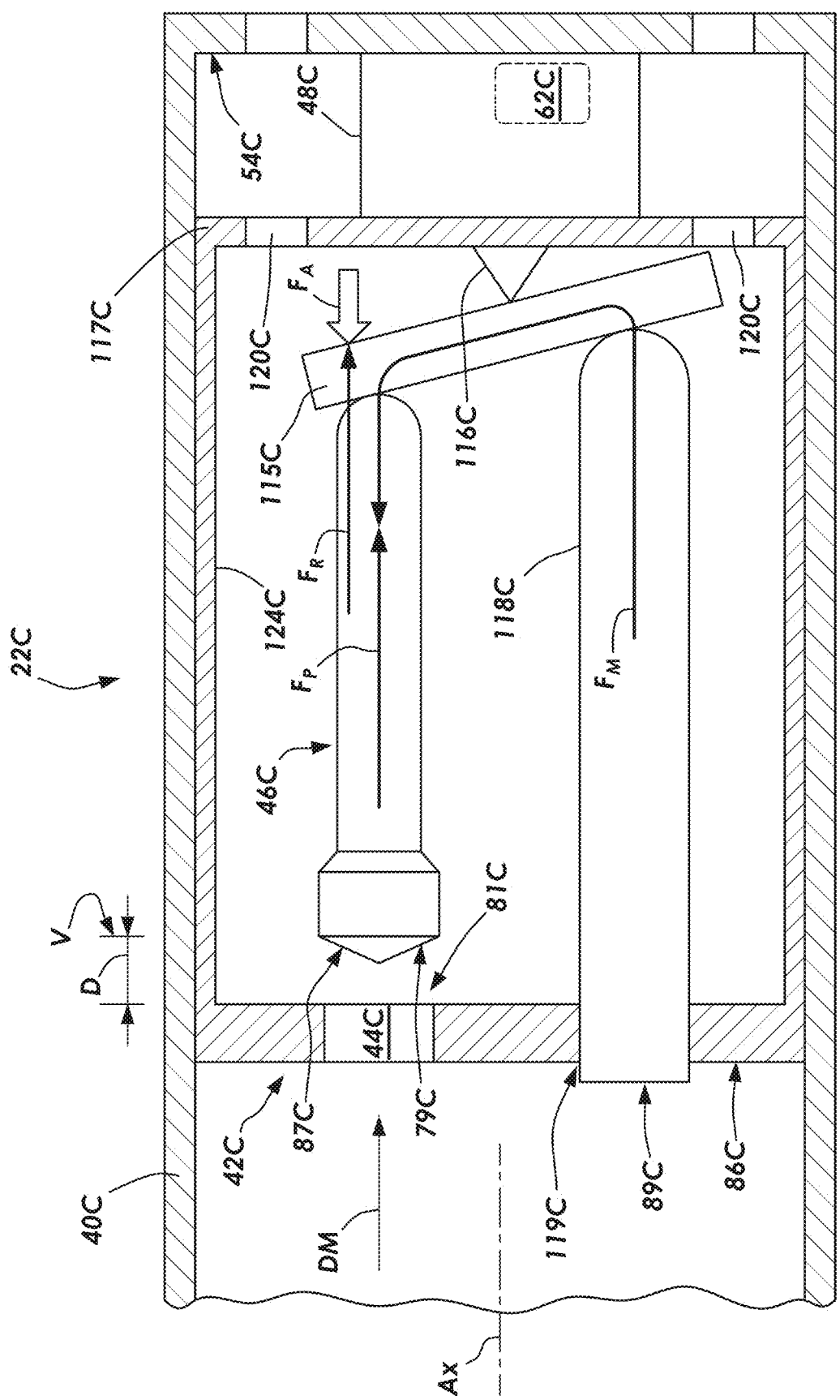

Illustrated in FIG. 10 is an alternate example of operation of the embodiment shown in FIG. 9. In this embodiment the drag forces exerted on the valve assembly 22C due to the flow of drilling mud DM is detected by observing a motor current of an electrical motor (not shown) in the actuator 48C that drives the plug member 46C of the valve assembly 22C. Referring back to FIG. 9, the FBR valve assembly includes an electrical motor (not shown) in the actuator 48C. In the FBR valve assembly, the plug member 46C in the valve assembly 22C is driven by applying to the locomotive connection (represented by fulcrum 116C and rocker 115C) a force provided by the actuator 48C (actuator force). The electrical motor in the actuator optionally generates a rotational movement or a torque (torque motor such as a synchronous spindle rotary motor) that is converted into a linear force (actuator force) through the locomotive connection. The locomotive connection optionally is a bevel gear as described in Peters '093. The actuator force drives the plug member 46C towards the opening 44C in orifice 42C, which is fixedly connected to the housing 40C. A force $F_P$ exerted on the plug member 46C by the flowing drilling mud DM acts in an opposite direction to the actuator force and is balanced at least partially by the force $F_M$ exerted by the flow of drilling mud DM on the piston 118C. Force FM is directed in an opposite direction to the direction of force $F_P$ when transferred through the locomotive connection onto the plug member 46C. A resulting force $F_R=F_P-F_M$ is acting on the locomotive connection and is to be compensated by the actuator force, when the plug member 46C is held at a set distance D. To hold the plug member in a specific position V or a corresponding set distance D from the opening 44C in the orifice 42C, the electrical motor is required to generate a torque large enough to compensate for the force $F_R$, which causes an electrical motor current demand. That is, a magnitude of the electrical motor current depends on, or is proportional to, a magnitude of the force $F_R$. In examples, an increase in the magnitude of the force will in turn increase the magnitude of the electrical motor current, and a decrease in the magnitude of the force $F_R$ will cause a decrease in the magnitude of the electrical motor current. The electrical motor current is optionally monitored or measured by a processor/controller 82 (FIG. 1), or an electrical motor current measurement device (not shown). In examples, the processor is configured to control the motor and consequently monitors the electrical motor current during operation of the electrical motor. A positioning senor (not shown) in communication with the processor provides information about the position of the plug member 46C via detecting the angle or the number of revolutions the spindle of the electrical motor rotates. Embodiments of the positioning sensor include a resolver providing a measure of the angle the electrical motor spindle rotates, and alternative position detection systems, such as a capacity sensor, a magnetic sensors, or optical sensors. The positioning sensor enables the processor to control the motor to position the upstream surface area 87C of the plug member 46C at the position V. A flow meter (not shown) is located either upstream or downstream of the valve assembly 22C, or the BHA 35 (FIG. 1) to measure the flowrate of the flowing drilling mud DM. Historical data generated in a lab, in an offset well, or determined by calculations is optionally used to determine the density of the drilling mud DM from the measured electrical motor current and the measured flow rate of the drilling mud DM. Examples of the historical data include a look-up table. In an alternative embodiment, the electrical motor current is converted into a density of the drilling mud DM by using a mathematical algorithm, the measured flow rate, a measure for a flow restricted area which is defined by the set distance D, a valve coefficient and optionally a gear ratio, which is within the capabilities of those skilled in the art. The electrical motor current measurement is affected by friction forces, which act on the spindle of the electrical motor, such as for example sealing elements which seal the inside of the electrical motor from the outside and the drilling mud. The friction force can optionally by removed from the electrical motor current measurement data by a superimposed oscillation of the plug member 46C around the position V. The oscillation has a small amplitude and is optionally only a millimeter or a few millimeters, such a 0.5 mm to 5 mm. Determining the average electrical motor current during the oscillation eliminates the contributions of the electrical motor current measurement caused by friction so that the measured electrical motor current value only represents the drag force $F_P$ exerted on the plug member 46C. Due to the oscillation, inertia forces come into play, which are optionally eliminated by averaging the electrical motor current over a number of oscillations (e.g., 5, 10, 20, or 100). The oscillation is optionally performed with a frequency or frequencies between 1 Hz and 10 Hz for a duration of a few seconds, such as from about 1 to 5 second, or about 1 to 10 seconds. Optionally, the electrical motor current of a single phase of the electrical power supply is measured (usually three phase electricity). The phase used for making the electrical motor current measurement is optionally the electrical phase with the highest current. The oscillation is optionally a sinusoidal oscillation or any other type of oscillation that allows for determining an average and eliminating friction force contributions. In an alternative embodiment instead of measuring the electrical motor current, the electrical power consumption of the electrical motor is measured.

Figure 11:
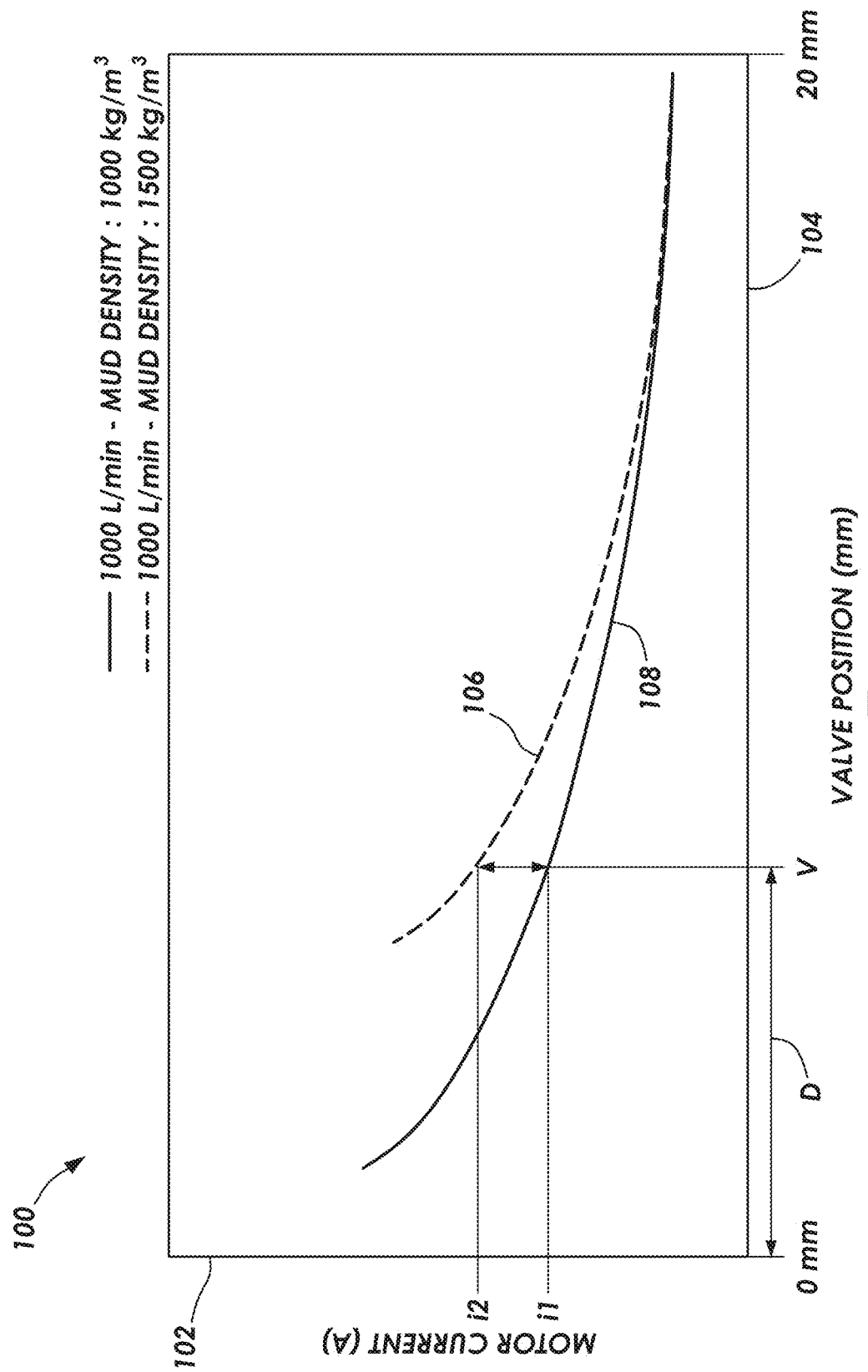
FIG. 11 is a graph of valve position versus motor current of example valve assemblies for different density drilling muds.

Shown in FIG. 11 is a graph 100 having an ordinate 102 which represents a current I measured by the processor. An abscissa 104 is included in graph 100, which represents values of the set distance D. In the graph 100 are two plots 106 and 108 that graphically represent corresponding values of electrical motor current I and set distances (i.e., distance of upstream surface area 87C from valve seat 81C) for different density drilling muds flowing at the same flow rate, which in the example shown is 1000 liters/minute. In the example shown, plot 106 represents a drilling mud having a first density, which is greater than a second density of the drilling mud represented by plot 108. Comparing the measured electrical motor current with the historical data allows determination of the mud density. To increase the precision of the density determination, the electrical motor currents measurements are optionally performed at a plurality of set distances D when obtaining electrical motor current I and set distance D data for creating plots 106 and 108, which increases accuracy when identifying historical data that represents the density of the drilling mud. The electrical motor current measurement is optionally performed either in a separate density measurement operation or during the regular valve operation, such as pulse generation of a mud pulser operation when the plug member 46C is selectively moved from a valve closed to a valve open position, in an alternatives and when in the valve closed position, the plug member 46C is spaced away from contact with valve seat 81C in the orifice 42C to reduce wear. In non-limiting examples, the determined density of the drilling mud is used to either adjust a valve assembly operation parameter, such as the set distance(s) while pulse generation, or the data rate (plug member reciprocation or oscillation frequency), or is used to adjust an operational parameter of the drilling assembly 10 operation such as flow rate, mud properties, or rate of perforation. In an alternative example, instead of measuring the electrical motor current, the force $F_P$ exerted on the plug member 46C is detected by directly sensing the torque of the spindle of the electrical motor in the actuator 48C by a torque meter (not shown), such as a strain gage, a torque measurement shaft or a load cell. In yet another example embodiment, the electrical motor current measurement is combined with a force measurement obtained with a force sensor and/or a torque measurement obtained with a torque meter.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A downhole valve assembly in a wellbore to determine a fluid density, the valve assembly comprising:
   a housing;
   a flow restrictor comprising an opening;
   a fluid flowing through the valve assembly and through the opening of the flow restrictor;
   a plug member configured to plug at least partially the opening of the flow restrictor;
   an actuator configured to drive the plug member relative to the flow restrictor to select a flow restricted area;
   a flow meter to measure a flow rate of the fluid flowing through the valve assembly;
   a measurement device in or on the valve assembly configured to measure a parameter related to a force acting on at least one of the flow restrictor and the plug member due to the fluid flowing through the valve assembly;
   a processor configured to:
      position the plug member in a selected position corresponding to the selected flow restricted area, using the actuator,
      obtain measurement data from the measurement device while the plug member is in the position corresponding to the selected flow restricted area, and
      determine a fluid density using the obtained measurement data and the measured flow rate.

2. The system of claim 1, wherein the measurement device is a force sensor configured to measure the force acting on the at least one of the flow restrictor and the plug member, and the measurement data is force data.

3. The system of claim 1, wherein the actuator comprises an electrical motor, the measurement device is configured to measure a parameter related to an electrical power consumption of the electrical motor that is required by the electrical motor to hold the plug member in the position corresponding to the selected flow restricted area, and the measurement data is one of electrical power consumption data and electrical motor current data.

4. The system of claim 3, wherein the processor is configured to oscillate the plug member around the position corresponding to the selected flow restricted area and determine the fluid density includes to calculate an average of one of the electrical power consumption data and the electrical motor current data.

5. The system of claim 1, wherein the valve assembly includes a piston and a locomotive connection.

6. The system of claim 1, wherein the valve assembly is a shear valve, the flow restrictor is a stator including at least one opening and the plug member is a rotor disc including at least one blade.

7. The system of claim 1, wherein the selected position includes a first selected position corresponding to a first selected flow restricted area and a second selected position corresponding to a second selected flow restricted area, and the measurement data includes first measurement data and second measurement data, the processor is configured to position the plug member in the first selected position and position the plug member in the second selected position and obtain the first measurement data from the measurement device while the plug member is in the first selected position and obtain the second measurement data from the measurement device while the plug member is in the second selected position and determine the fluid density using the first measurement data and the second measurement data.

8. The system of claim 1, wherein the actuator comprises a spindle and the measurement device is a torque meter configured to measure a torque acting on the spindle, and the measurement data is torque data.

9. The system of claim 1, wherein the valve assembly is part of a downhole telemetry system, and the fluid is a drilling mud, the valve assembly generates pressure pulses in the drilling mud in the wellbore, and the downhole telemetry system comprises a pressure transducer at a surface location configured to detect the pressure pulses.

10. The system of claim 1, wherein the measurement device is in or on the actuator.

11. A method for measuring a fluid density in a wellbore, the method comprising:
    directing a flow of fluid through a valve assembly in the wellbore, the valve assembly comprising a housing, an actuator, a plug member, a processor, a measurement device, a flow meter, and a flow restrictor, the flow restrictor includes an opening;
    positioning, using the processor and the actuator, the plug member relative to the opening of the flow restrictor defining a selected flow restricted area;
    detecting a flow rate of the flow of fluid, using the flow meter;
    measuring, using the measurement device, measurement data related to a force exerted on at least one of the flow restrictor and the plug member by the flow of fluid;
    obtaining, using the processor, the measurement data from the measurement device;
    determining a fluid density, using the processor, based on the measurement data and the detected flow rate; and
    adjusting an operational parameter based on the determined fluid density.

12. The method of claim 11, wherein the measurement device is a force sensor and the measurement data is force data.

13. The method of claim 11, wherein the actuator comprises an electrical motor and measuring the measurement data includes measuring electrical current data or electrical power consumption data using the measurement device.

14. The method of claim 13, further comprising oscillating the plug member around a position corresponding to the selected flow restricted area using the processor and the actuator, and wherein determining the fluid density includes calculating an average of at least one of the electrical current data and the electrical power consumption data.

15. The method of claim 11, wherein the valve assembly includes a piston and a locomotive connection.

16. The method of claim 11, wherein the valve assembly is a shear valve and the flow restrictor is a stator and the plug member is a rotor disc.

17. The method of claim 11, wherein the selected position includes a first selected position corresponding to a first selected flow restricted area and a second selected position corresponding to a second selected flow restricted area, and the measurement data includes first measurement data and second measurement data, positioning the plug member in the first selected position and positioning the plug member in the second selected position, obtaining the first measurement data from the measurement device while the plug member is in the first selected position and obtaining the second measurement data from the measurement device while the plug member is in the second selected position and determining the fluid density using the first measurement data and the second measurement data.

18. The method of claim 11, wherein the actuator comprises a spindle and the measurement device is a torque meter, and measuring a torque acting on the spindle, using the torque meter.

19. The method of claim 11, wherein determining the fluid density includes using historical data, wherein the historical data are obtained in a lab, in an offset well, or by using a calculation.

20. The method of claim 11, wherein the determining of the fluid density is performed while the processor is in the wellbore and while performing a downhole operation, and wherein adjusting an operational parameter includes adjusting one or more of an operational parameter of the valve assembly, and an operational parameter of a drilling system.

* * * * *